(12) United States Patent
Lee

(10) Patent No.: US 10,066,810 B2
(45) Date of Patent: Sep. 4, 2018

(54) OPTICAL MEMBER, DISPLAY DEVICE HAVING THE SAME AND METHOD OF FABRICATING THE SAME

(71) Applicant: LG INNOTEK CO., LTD., Seoul (KR)

(72) Inventor: Jin Ho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 485 days.

(21) Appl. No.: 14/301,044

(22) Filed: Jun. 10, 2014

(65) Prior Publication Data

US 2014/0313692 A1   Oct. 23, 2014

Related U.S. Application Data

(63) Continuation of application No. 13/354,468, filed on Jan. 20, 2012, now Pat. No. 8,852,469.

(30) Foreign Application Priority Data

Jan. 21, 2011 (KR) .................. 10-2011-0006524

(51) Int. Cl.
*F21V 9/16* (2006.01)
*G02B 1/12* (2006.01)
(Continued)

(52) U.S. Cl.
CPC .......... *F21V 9/16* (2013.01); *B29D 11/00634* (2013.01); *F21V 9/30* (2018.02); *G02B 6/0028* (2013.01); *G02B 6/0065* (2013.01)

(58) Field of Classification Search
CPC ................ G02B 6/0028; G02B 6/0065; B29D 11/00634; F21V 9/16
See application file for complete search history.

(56) References Cited

U.S. PATENT DOCUMENTS 6,637,905 B1   10/2003  Ng et al.
2004/0178523 A1   9/2004  Jackman et al.
(Continued)

FOREIGN PATENT DOCUMENTS

JP   2004-119375 A   4/2004
JP   2007-266349   * 10/2007
(Continued)

OTHER PUBLICATIONS

Office Action dated May 14, 2012 in Korean Application No. 10-2011-0006524.

*Primary Examiner* — Mathieu Vargot
(74) *Attorney, Agent, or Firm* — Saliwanchik, Lloyd & Eisenschenk

(57) ABSTRACT

Disclosed are an optical member, a display device including the optical member and a method of fabricating the optical member. The display device includes a light source; a wavelength conversion member into which light generated from the light source is incident; and a display panel into which light is incident from the wavelength conversion member. The wavelength conversion member includes a receiving part having a pipe shape; a matrix in the receiving part; and a plurality of wavelength conversion particles disposed in the matrix to convert a wavelength of the light generated from the light source.

11 Claims, 7 Drawing Sheets

(51) Int. Cl.
*B29D 11/00* (2006.01)
*F21V 8/00* (2006.01)
*F21V 9/30* (2018.01)

(56) References Cited

U.S. PATENT DOCUMENTS

| | | |
|---|---|---|
| 2005/0194881 A1 | 9/2005 | Nam et al. |
| 2008/0278954 A1* | 11/2008 | Speier ................. F21K 9/00 362/373 |
| 2010/0039591 A1 | 2/2010 | Nagasawa et al. |
| 2010/0051898 A1 | 3/2010 | Kim et al. |
| 2011/0141769 A1* | 6/2011 | Lee .................. G02B 6/0023 362/629 |
| 2011/0249424 A1 | 10/2011 | Joo et al. |

FOREIGN PATENT DOCUMENTS

| | | |
|---|---|---|
| JP | 2008-053564 A | 3/2008 |
| JP | 2008-088237 A | 4/2008 |
| KR | 10-2005-0088791 A | 9/2005 |
| KR | 10-2009-0034795 A | 4/2009 |

* cited by examiner

OPTICAL MEMBER, DISPLAY DEVICE HAVING THE SAME AND METHOD OF FABRICATING THE SAME

CROSS-REFERENCE TO RELATED APPLICATIONS

This application is a continuation of application Ser. No. 13/354,468, filed Jan. 20, 2012, now U.S. Pat. No. 8,852,469, which claims the benefit under 35 U.S.C. § 119 of Korean Patent Application No. 10-2011-0006524, filed Jan. 21, 2011, which is hereby incorporated by reference in its entirety.

BACKGROUND

The disclosure relates to an optical member and a display device.

A light emitting diode (LED) is a semiconductor device that converts electricity into ultraviolet ray, visible ray or infrared ray by using characteristics of compound semiconductors. The LED is mainly used for home appliances, remote controllers and large-size electric signboards.

A high-brightness LED is used as a light source for a lighting device. Since the LED represents the superior energy efficiency and long life span, the replacement cost may be reduced. In addition, the LED is strong against vibration and impact and it is not necessary to use toxic substances, such as Hg, so the LED substitutes for a glow lamp and a fluorescent lamp in terms of energy saving, environmental protection and cost reduction.

In addition, the LED may be advantageously used as a light source for a middle-size or large-size LCD TV and a monitor. When comparing with a cold cathode fluorescent lamp (CCFL) mainly used in a liquid crystal display (LCD), the LED represents superior color purity and low power consumption and can be fabricated in a small size, so various products equipped with the LED have been produced and studies for the LED have been actively performed.

Recently, various technologies have been suggested to generate white light by using a blue LED and a quantum dot (QD) serving as a phosphor to emit red light and green light. This is because the white light generated by using the quantum dot may have the high brightness and superior color reproduction property.

Nevertheless, studies and research are still necessary to reduce the light loss and to improve the color uniformity when the quantum dot is employed in an LED backlight unit.

BRIEF SUMMARY

The embodiment provides an optical member having superior reliability and chemical resistance, a display device having the optical member and a method of fabricating the optical member.

A wavelength conversion member according to the embodiment is placed in a matrix having a superior sealing function. In particular, the matrix may include epoxy resin, acryl resin, polyimide, silicon resin or polycarbonate to reduce penetration of oxygen and moisture from the outside.

Therefore, the matrix can effectively protect wavelength conversion particles from the external chemical impact.

Especially, when the matrix is disposed in a tube, since the matrix has the superior sealing function, it is not necessary to use additional sealing parts to seal both ends of the tube.

Thus, the wavelength conversion member according to the embodiment can be readily fabricated.

In addition, the display device according to the embodiment may have the superior reliability and improved image quality.

DETAILED DESCRIPTION

Figure 1:
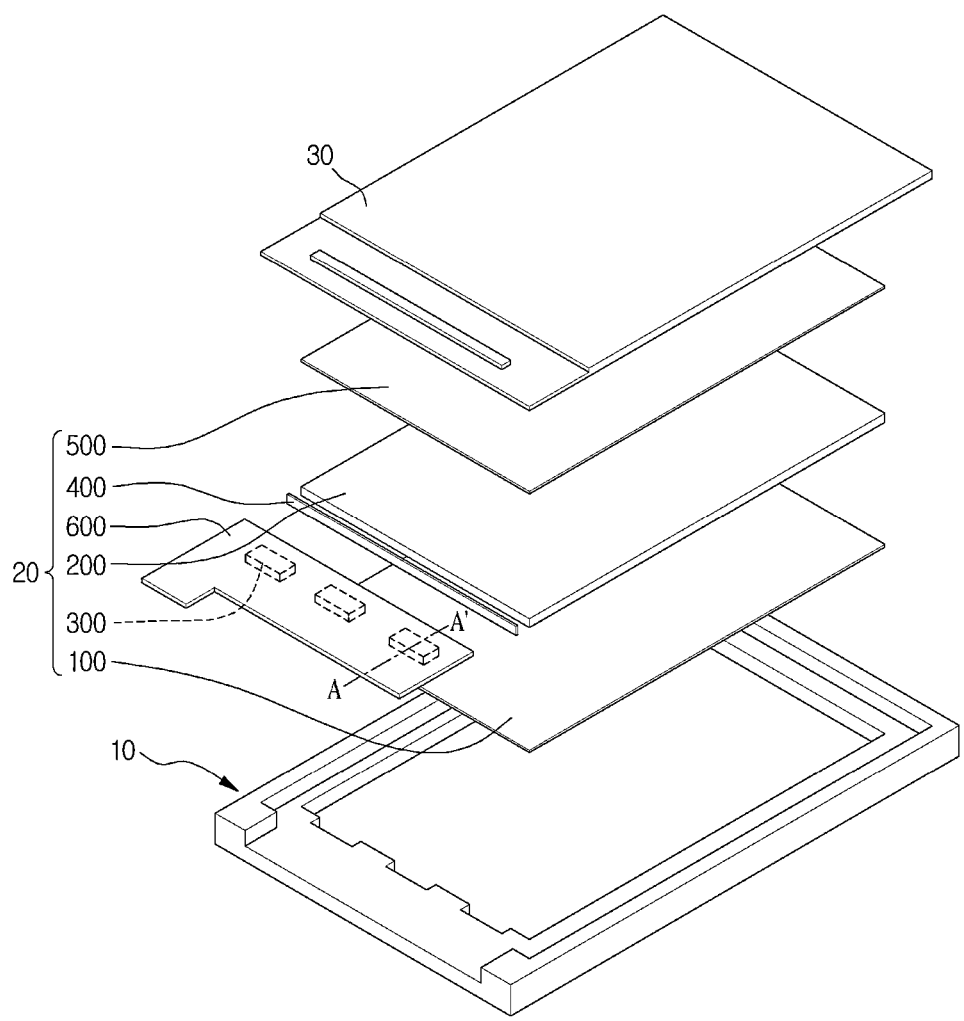
FIG. 1 is an exploded perspective view of a liquid crystal display device according to the embodiment.

Hereinafter, a liquid crystal display device according to the embodiments will be described in detail with reference to accompanying drawings. In the description of the embodiments, it will be understood that, when a substrate, a frame, a sheet, a layer or a pattern is referred to as being "on" or "under" another substrate, another frame, another sheet, another layer, or another pattern, it can be "directly" or "indirectly" on the other substrate, frame, sheet, layer, or pattern, or one or more intervening layers may also be present. Such a position of the layer has been described with reference to the drawings. The size of elements shown in the drawings may be exaggerated for the purpose of convenience or clarity. In addition, the size of elements does not utterly reflect an actual size.

Figure 2:
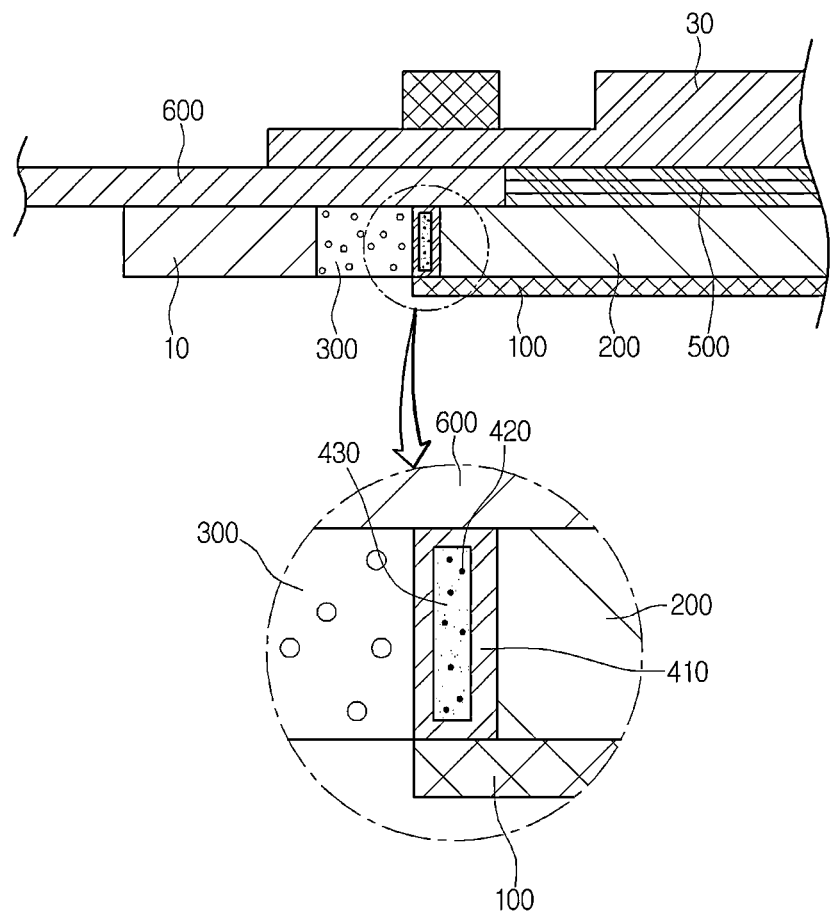
FIG. 2 is a sectional view taken along line A-A' of FIG. 1.
Figure 3:
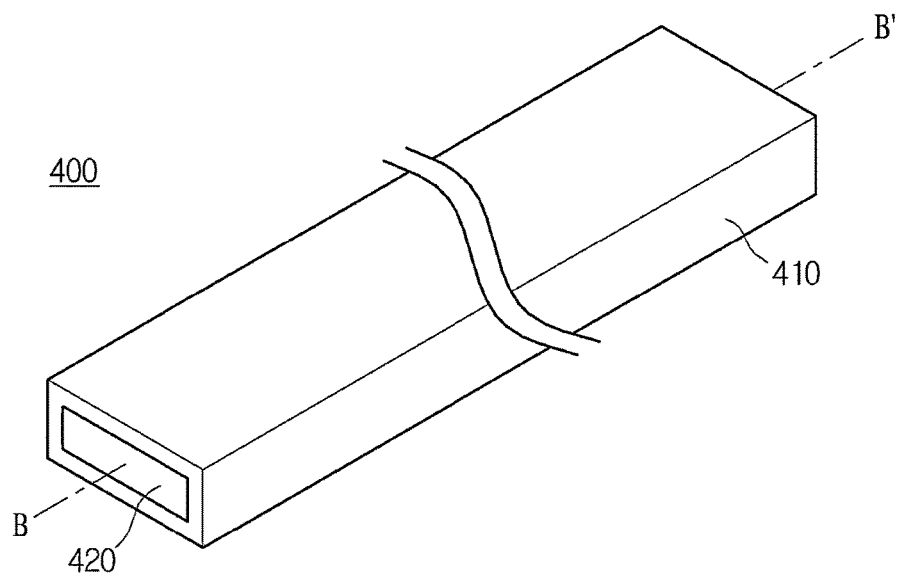
FIG. 3 is a perspective view of a wavelength conversion member according to the embodiment.
Figure 4:
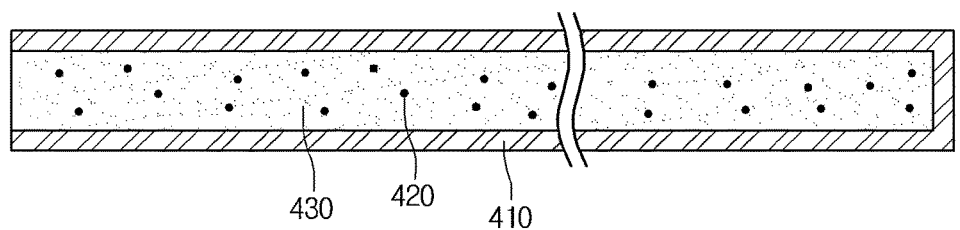
FIG. 4 is a sectional view taken along line B-B' of FIG. 3.
Figure 5:
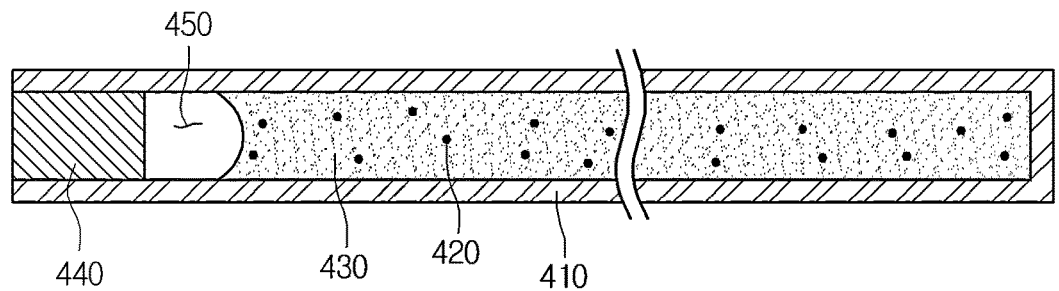
FIG. 5 is a sectional view of a wavelength conversion member according to another embodiment.
Figure 6:
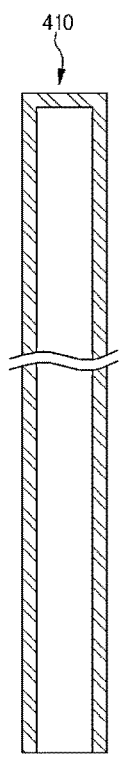
FIGS. 6 to 8 are views showing the procedure for fabricating a wavelength conversion member according to the embodiment.
Figure 7:
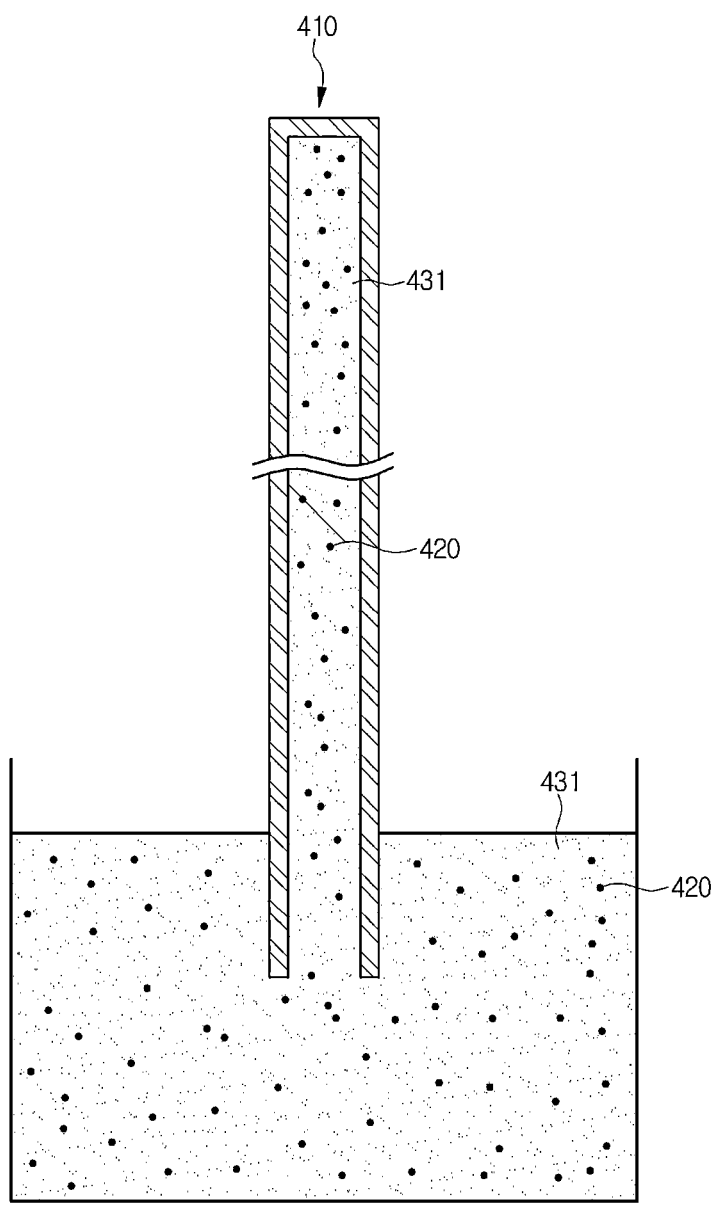
Figure 8:
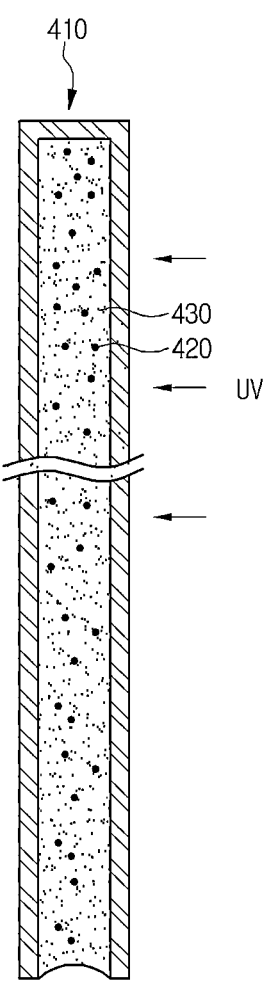
Figure 9:
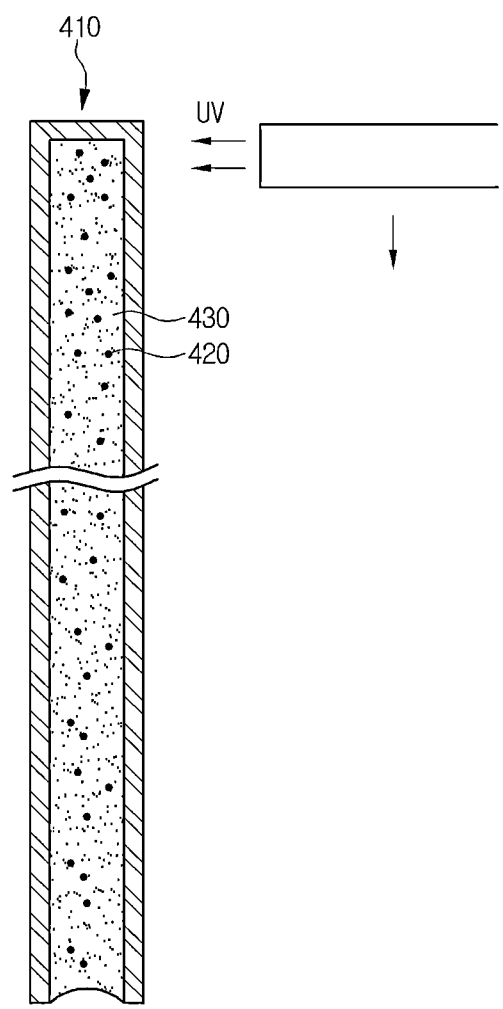
FIG. 9 is a view showing the procedure for fabricating a wavelength conversion member according to another embodiment.

FIG. 1 is an exploded perspective view of a liquid crystal display device according to the first embodiment. FIG. 2 is a sectional view taken along line A-A' of FIG. 1. FIG. 3 is a perspective view of a wavelength conversion member according to the first embodiment. FIG. 4 is a sectional view taken along line B-B' of FIG. 3. FIG. 5 is a sectional view of a wavelength conversion member according to another embodiment. FIGS. 6 to 8 are views showing the procedure for fabricating a wavelength conversion member according to the embodiment. FIG. 9 is a view showing the procedure for fabricating a wavelength conversion member according to another embodiment.

Referring to FIGS. 1 to 4, the liquid crystal display device according to the embodiment includes a mold frame 10, a backlight assembly 20 and a liquid crystal panel 30.

The mold frame 10 receives the backlight assembly 20 and the liquid crystal panel 30. The mold frame 10 has a rectangular frame shape. For instance, the mold frame 10 may include plastic or reinforced plastic.

A chassis, which surrounds the mold frame 10 and supports the backlight assembly 20, may be disposed below the mold frame 10. The chassis may also be disposed at the lateral side of the mold frame 10.

The backlight assembly 20 is disposed inside the mold frame 10. The backlight assembly generates light and emits the light toward the liquid crystal panel 30. The backlight assembly 20 includes a reflective sheet 100, a light guide plate 200, light emitting diodes 300, a wavelength conversion member 400, a plurality of optical sheets 500, and a flexible printed circuit board (FPCB) 600.

The reflective sheet 100 reflects the light, which is generated from the light emitting diodes 300, in the upward direction.

The light guide plate 200 is disposed on the reflective sheet 100. The light guide plate 200 receives the light generated from the light emitting diodes 300 and reflects the light in the upward direction through the reflection, refraction, and scattering.

The light guide plate 200 includes an incident surface facing the light emitting diodes 300. Among the lateral sides of the light guide plate 200, a lateral side facing the light emitting diodes 300 may serve as the incident surface.

The light emitting diodes 300 are disposed at the lateral side of the light guide plate 200. In detail, the light emitting diodes 300 are disposed at the incident surface of the light guide plate 200.

The light emitting diodes 300 may serve as light sources for generating the light. In detail, the light emitting diodes 300 may emit the light toward the wavelength conversion member 400.

The light emitting diodes 300 may be blue light emitting diodes that generates blue light or UV light emitting diodes that emits UV light. That is, the light emitting diodes 300 may generate the blue light having the wavelength band in the range of about 430 nm to about 460 nm, or the UV light having the wavelength band in the range of about 300 nm to about 400 nm.

The light emitting diodes 300 may be mounted on the FPCB 600. The light emitting diodes 300 may be disposed under the FPCB 600. The light emitting diodes 300 may be driven by receiving the driving signal through the FPCB 600.

The wavelength conversion member 400 is disposed between the light emitting diodes 300 and the light guide plate 200. The wavelength conversion member 400 is bonded to the lateral side of the light guide plate 200. In detail, the wavelength conversion member 400 is bonded to the incident surface of the light guide plate 200. In addition, the wavelength conversion member 400 can be bonded to the light emitting diodes 300.

The wavelength conversion member 400 receives the light emitted from the light emitting diodes 300 in order to convert the wavelength of the light. In detail, the wavelength conversion member 400 may convert the blue light emitted from the light emitting diodes 300 into the green light and the red light. That is, the wavelength conversion member 400 may convert a part of the blue light into the green light having the wavelength in the range of about 520 nm to about 560 nm and a part of the blue light into the red light having the wavelength in the range of about 630 nm to about 660 nm.

In addition, the wavelength conversion member 400 may convert the UV light emitted from the light emitting diodes 300 into the blue light, the green light and the red light. That is, the wavelength conversion member 400 may convert a part of the UV light into the blue light having the wavelength in the range of about 430 nm to about 470 nm, a part of the UV light into the green light having the wavelength in the range of about 520 nm to about 560 nm and a part of the UV light into the red light having the wavelength in the range of about 630 nm to about 660 nm.

Therefore, the white light may be generated by the light passing through the wavelength conversion member 400 and the lights converted by the wavelength conversion member 400. In detail, the white light can be incident into the light guide plate 200 through the combination of the blue light, the green light and the red right.

As shown in FIGS. 3 and 4, the wavelength conversion member 400 includes a tube 410, a plurality of wavelength conversion particles 420, and a matrix 430.

The tube 410 receives the wavelength conversion particles 420 and the matrix 430 therein. That is, the tube 410 may serve as a receptacle to receive the wavelength conversion particles 420 and the matrix 430. In addition, the tube 410 extends in one direction.

The tube 410 may have a rectangular shape. In detail, a section of the tube 410, which is vertical to the length direction of the tube 410, may have the rectangular shape. In addition, the tube 410 may have a width of about 0.6 mm and a height of about 0.2 mm. The tube 410 may include a capillary tube.

The wavelength conversion particles 420 are provided in the tube 410. In detail, the wavelength conversion particles 420 are uniformly distributed in the matrix 430 installed in the tube 410. That is, the wavelength conversion particles 420 are inserted into the matrix 430.

The wavelength conversion particles 420 convert the wavelength of the light emitted from the light emitting diodes 300. In detail, the wavelength conversion particles 420 receive the light emitted from the light emitting diodes 300 in order to convert the wavelength of the light. For instance, the wavelength conversion particles 420 can convert the blue light emitted from the light emitting diodes 300 into the green light and the red light. That is, a part of the wavelength conversion particles 420 converts the blue light into the green light having the wavelength in the range of about 520 nm to about 560 nm and a part of the wavelength conversion particles 420 converts the blue light into the red light having the wavelength in the range of about 630 nm to about 660 nm.

In addition, the wavelength conversion particles 420 can convert the UV light emitted from the light emitting diodes 300 into the blue light, the green light and the red light. That is, a part of the wavelength conversion particles 420 converts the UV light into the blue light having the wavelength in the range of about 430 nm to about 470 nm, and a part of the wavelength conversion particles 420 converts the UV light into the green light having the wavelength in the range of about 520 nm to about 560 nm. Further, a part of the wavelength conversion particles 420 converts the UV light into the red light having the wavelength in the range of about 630 nm to about 660 nm.

In other words, if the light emitting diodes 300 are blue light emitting diodes that emit the blue light, the wavelength conversion particles 420 capable of converting the blue light into the green light and the red light may be employed. In addition, if the light emitting diodes 300 are UV light emitting diodes that emit the UV light, the wavelength conversion particles 420 capable of converting the UV light into the blue light, the green light and the red light may be employed.

The wavelength conversion particles 420 may include a plurality of quantum dots. The quantum dots may include core nano-crystals and shell nano-crystals surrounding the core nano-crystals. In addition, the quantum dots may include organic ligands bonded to the shell nano-crystals. Further, the quantum dots may include an organic coating layer surrounding the shell nano-crystals.

The shell nano-crystals can be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient higher than that of the general fluorescent pigment by 100 to 1000 times and has the superior quantum yield, so that strong fluorescent light can be generated.

The quantum dots can be synthesized through the chemical wet scheme. According to the chemical wet scheme, the particles are grown by immersing the precursor material in the organic solvent. The quantum dots can be synthesized through the chemical wet scheme.

The matrix 430 surrounds the wavelength conversion particles 420. In detail, the wavelength conversion particles 420 are uniformly distributed in the matrix 430. The matrix 430 includes polymer. The matrix 430 is transparent. That is, the matrix 430 includes transparent polymer.

The matrix 430 has a superior sealing function. In detail, the matrix 430 has low oxygen transmissibility.

In addition, the matrix 430 can be formed by using high-density polymer. For instance, the matrix 430 may include polymer having the density of about 1.0 g/ml to about 2.0 g/ml. In addition, the matrix 430 may include polymer having the refractive index of about 1.4 to about 1.6.

The matrix 430 may include epoxy resin, acryl resin, polyimide, or silicon resin. Preferably, the matrix 430 may include the silicon resin.

The silicon resin may have the skeletal structure of siloxane bond (—Si—O—). In addition, the methyl group, the phenyl group or the hydroxyl group may be added to the siloxane skeletal structure.

For instance, the silicon resin can be expressed as following chemical formula 1.

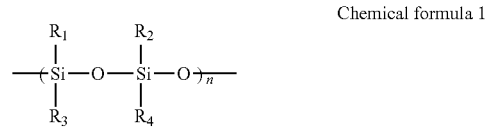

Chemical formula 1

In chemical formula 1, $R_1$, $R_2$, $R_2$ and $R_4$ can be independently selected from the group consisting of hydrogen, halogen element, alkyl group, aryl group, cyclo alkyl group and hetero aryl group.

In detail, the silicon resin used for the matrix 430 can be expressed as following chemical formula 2.

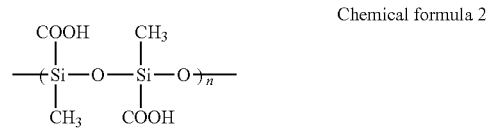

Chemical formula 2

In addition, the matrix 430 may further include a cross-linking agent. The sealing function of the matrix 430 can be more improved due to the cross-linking agent. The amount of the cross-linking agent added to the matrix 430 may be about 20 wt % to about 25 wt %.

For instance, the cross-linking agent may include one selected from the group consisting of 1,6-Hexanediol Diacrylate, Dipropylene glycol Diacrylate, Neopentyl glycol Diacrylate, Trimethylolpropane Triacrylate, Ethoxylated Trimethylolpropane Triacrylate, Trimethylolpropane Trimethacrylate, Pentaerythritol Tetraacrylate, Dipentaerylthritol Hexaacrylate, Vinyltriethoxysilane, Vinyltrimethoxysilane, Vinyl-tris-(2-methoxyethoxy) silane and Vinylmethyldimethoxysilane.

In addition, the matrix 430 may include metal salt. In detail, the matrix 430 may include platinum salt. Due to the platinum salt, the sealing function of the matrix 430, in detail, the oxygen blocking property of the matrix 430 can be improved. The very small amount of the platinum salt is included in the matrix 430. Preferably, the amount of the platinum salt included in the matrix 430 is about 0.01 wt % to about 0.1 wt %.

The platinum salt may include platinum amine, platinum chloride or platinum ammonium.

The matrix 430 is disposed in the tube 410. In detail, the matrix 430 is fully filled in the tube 410. The matrix 430 may adhere to an inner surface of the tube 410.

As shown in FIG. 5, the wavelength conversion member 400 may further include a sealing part 440.

The sealing part 440 is disposed in the tube 410. The sealing part 440 is positioned at the end portion of the tube 410 to seal the tube 410. The sealing part 440 may include epoxy resin.

Due to the sealing part 440, the oxygen and moisture can be effectively inhibited from penetrating into the tube 410. In addition, the sealing part 440 may further include the metal salt.

An air layer 450 can be interposed between the sealing part 440 and the matrix 430. The air layer 450 may include gas having a low reactivity, such as nitrogen or inert gas.

FIGS. 6 to 9 are views showing the procedure for fabricating the wavelength conversion member 400. As shown in FIGS. 6 to 9, the wavelength conversion member 400 is fabricated through the following method.

Referring to FIG. 6, the tube 410 is prepared. One end of the tube 410 is sealed and the other end of the tube 410 is open.

Referring to FIG. 7, the wavelength conversion particles 420 are uniformly distributed in a resin composition 431. The resin composition 431 is transparent. The resin composition 431 may have the photo-curable property.

The resin composition 431 may include epoxy resin, acryl resin, polyamic acid, bisphenol A resin or silicon resin. In addition, the resin composition 431 may include acrylate monomer or siloxane monomer.

In addition, the resin composition 431 may include a photo-curing initiator. For instance, the photo-curing initiator may include one selected from the group consisting of α-hydroxyketone, phenylglyoxylate, benzildimethyl ketal, α-aminoketone, mono acyl phosphine, bis acyl phosphine, 2,2-dimethoxy-2-phenylacetophenone and a mixture thereof.

The resin composition 431 may further include the cross-linking agent. In addition, the resin composition 431 may further include an additive to improve the sealing function. In detail, the metal salt, such as the platinum salt, can be added to the resin composition 431 as the additive.

After that, the internal pressure of the tube 410 is reduced and one end of the tube 410 is dipped into the resin composition 431 having the wavelength conversion particles 420 distributed therein. Then, the ambient pressure is increased. Thus, the resin composition 431 having the wavelength conversion particles 420 distributed therein is introduced into the tube 410.

Referring to FIG. 8, the resin composition 431 introduced into the tube 410 is cured by the UV light, so that the matrix 430 is formed. At this time, the UV light is simultaneously irradiated over the whole area of the tube 410 to cure the resin composition 431.

In contrast, referring to FIG. 9, the resin composition 431 introduced into the tube 410 can be sequentially cured. That is, the UV light is sequentially irradiated from one end to the other end of the tube 410 in order to sequentially cure the resin composition 431 introduced into the tube 410.

In detail, the UV light is primarily irradiated onto the sealed end portion of the tube 410 and then consecutively moved toward the open end portion of the tube 410. At this time, a UV irradiator capable of irradiating the UV light onto the very-limited region can be used.

The resin composition 431 may be shrunk during the photo-curing process. However, since the resin composition 431 introduced into the tube 410 is sequentially cured from one end to the other end of the tube 410, the matrix 430 may not be spaced apart from the tube 410 caused by the shrinkage of the resin composition 431.

That is, when the resin composition 431 is cured and shrunk at one end of the tube 410, the non-cured resin composition 431 can be further moved to one end of the tube 410.

Therefore, the shrinkage of the resin composition 431 in the radial direction can be reduced. That is, according to the curing method of the embodiment, the shrinkage of the resin composition 431 in the direction vertical to the length direction of the tube 410 can be reduced.

Thus, according to the curing method of the embodiment, the sealing degree between the matrix 430 and the tube 410 can be improved and the oxygen can be inhibited from penetrating into the wavelength conversion particles 420.

Referring again to FIGS. 1 to 4, the optical sheets 500 are disposed on the light guide plate 200 to improve the characteristic of the light passing through the optical sheets 500.

The FPCB 600 is electrically connected to the light emitting diodes 300. The FPCB 600 can mount the light emitting diodes 300 thereon. The FPCB 600 is installed in the mold frame 10 and arranged on the light guide plate 200.

The mold frame 10 and the backlight assembly 20 constitute the backlight unit. That is, the backlight unit includes the mold frame 10 and the backlight assembly 20.

The liquid crystal panel 30 is installed in the mold frame 10 and arranged on the optical sheets 500.

The liquid crystal panel 30 displays images by adjusting intensity of the light passing through the liquid crystal panel 30. That is, the liquid crystal panel 30 is a display panel to display the images. The liquid crystal panel 30 displays the images by using the light having the wavelength converted by the wavelength conversion member 400. The liquid crystal panel 30 includes a TFT substrate, a color filter substrate, a liquid crystal layer interposed between the above two substrates and polarizing filters.

As described above, the wavelength conversion particles 420 are disposed in the matrix 430 having the superior sealing function. In particular, since the matrix 430 includes the epoxy resin, acryl resin, polyimide, silicon resin or polycarbonate, the oxygen and the moisture can be inhibited from penetrating into the matrix 430. In addition, the matrix 430 includes the metal salt, such as the platinum salt, so that the oxygen blocking property of the matrix 430 can be improved.

As a result, the matrix 430 can effectively protect the wavelength conversion particles 420 from the external chemical impact.

In particular, the matrix 430 disposed in the tube 410 has the superior sealing property, an additional sealing part is not necessary to seal the end portions of the tube 410. Thus, the wavelength conversion member 400 can be readily fabricated.

Therefore, the liquid crystal display device according to the embodiment may improve the reliability and the image quality.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

EXPERIMENTAL EXAMPLE

About 10 wt % of quantum dots (available from NANOSYS, Inc.) was added to silicon resin having the chemical formula as shown below.

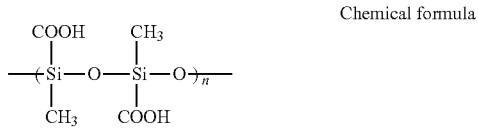

Chemical formula (wherein n is 5~20, and molecular weight is 1000~10000)

In addition, about 20 wt % of cross-linking agent was added to the silicon resin and about 0.01 wt % of platinum amine was added to the silicon resin. The resin composition #1 prepared through the above process was uniformly mixed by a planetary mill and aged for 12 hours. After that, the resin composition #1 was introduced into a capillary tube having a width of about 2 mm and a thickness of about 1 mm and the resin composition #1 was cured by the UV light, thereby fabricating the wavelength conversion member #1.

COMPARATIVE EXAMPLE

The cross-linking agent and quantum dots were added to a dispersive medium (product) of NANOSYS, Inc., similarly to the experimental example except for the platinum amine, thereby forming the resin composition #2. After that, the wavelength conversion member #2 was fabricated similarly to the experimental example.

Then, the wavelength conversion member #1 and the wavelength conversion member #2 were exposed in the high-density and high-pressure oxygen atmosphere for 24 hours. The wavelength conversion efficiency of the wavelength conversion member #1 was about 90% and the wavelength conversion efficiency of the wavelength conversion member #2 was about 80%.

What is claimed is:

1. A display device comprising:
a frame;
a backlight assembly on the frame; and
a liquid crystal panel on the backlight assembly;
wherein the backlight assembly comprises:
a reflective sheet;
a light guide plate on the reflective sheet;
a flexible printed circuit board on the light guide plate;
optical sheets on the light guide plate;
a light source disposed at an incident surface of the light guide plate; and
a wavelength conversion member disposed between the light source and the light guide plate,
wherein the light source is mounted on the flexible printed circuit board,
wherein the light source is disposed under the flexible printed circuit board,
wherein a one end of the flexible printed circuit board is in direct physical contact with a one end of the optical sheets,
wherein the flexible printed circuit board covers a top surface of the wavelength conversion member,
wherein the flexible printed circuit board is in direct physical contact with the frame, the light source, the wavelength conversion member, light guide plate, the optical sheets, and the liquid crystal panel;
wherein the wavelength conversion member comprises:
a tube;
a matrix disposed in the tube; and
a plurality of wavelength conversion particles in the matrix,
wherein the matrix includes a silicon resin, a cross-linking agent, and a platinum salt;
wherein an amount of the cross-linking agent in the matrix is 20 wt % to 25 wt %,
wherein an amount of the platinum salt included in the matrix is 0.01 wt % to 0.1 wt %,
wherein the cross-linking agent includes one selected from the group consisting of 1.6-Hexanediol Diacrylate, Dipropylene glycol Diacrylate, Neopentyl glycol Diacrylate, Trimethylolpropane Triacrylate, Ethoxylated Trimethylolpropane Triacrylate, Trimethylolpropane Trimethacrylate, Pentaerythritol Tetraacrylate, Dipentaerylthritol Hexaacrylate, Vinyltriethoxysilane, Vinyltrimethoxysilane, Vinyl-tris-(2-methoxyethoxy) silane, and Vinylmethyldimethoxysilane;
wherein the platinum salt includes at least one of platinum amine, platinum chloride, and platinum ammonium;
wherein the tube is monolithically formed,
wherein the tube is in direct physical contact with the light source and the light guide plate,
wherein the plurality of wavelength conversion particles include quantum dots,
wherein the matrix has a refractive index in a range of from 1.4 to 1.6,
wherein the matrix is in contact with an inner surface of the tube,
wherein at least one surface of the matrix is in contact with an air layer,
wherein the tube extends continuously along the incident surface of the light guide plate, and
wherein the light source includes a plurality of blue LEDs and the plurality of blue LEDs are disposed along the incident surface of the light guide plate.

2. The display device of claim 1, wherein the matrix includes the silicon resin represented by the following chemical formula 1:

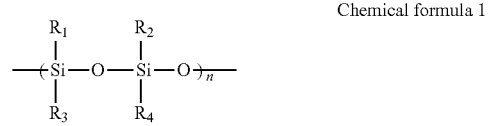

Chemical formula 1 wherein, $R_1$, $R_2$, $R_3$ and $R_4$ are independently selected from the group consisting of hydrogen, halogen element, alkyl group, aryl group, cyclo alkyl group and hetero aryl group.

3. A backlight assembly comprising:
a reflective sheet;
a light guide plate on the reflective sheet;
a flexible printed circuit board on the light guide plate;
optical sheets on the light guide plate;
a light source disposed at an incident surface of the light guide plate; and
a wavelength conversion member disposed between the light source and the light guide plate,
wherein the light source is mounted on the flexible printed circuit board,
wherein the light source is disposed under the flexible printed circuit board, wherein a one end of the flexible printed circuit board is in direct physical contact with a one end of the optical sheets, wherein the flexible printed circuit board covers a top surface of the wavelength conversion member, wherein the flexible printed circuit board is in direct physical contact with the light source, the wavelength conversion member, light guide plate, and the optical sheets;

wherein the wavelength conversion member comprises:
a tube;
a matrix disposed in the tube; and
a plurality of wavelength conversion particles in the matrix, wherein the matrix includes a silicon resin, a cross-linking agent, and a platinum salt;

wherein an amount of the cross-linking agent in the matrix is 20 wt % to 25 wt %, wherein an amount of the platinum salt is included in the matrix is 0.01 wt % to 0.1 wt %, wherein the cross-linking agent includes one selected from the group consisting of 1,6-Hexanediol Diacrylate, Dipropylene glycol Diacrylate, Neopentyl glycol Diacrvlate, Trimethylolpropane Triacrylate, Ethoxylated Trimethylolpropane Triacrylate, Trimethylolpropane Trimethacrylate, Pentaerythritol Tetraacrylate, Dipentaerylthritol Hexaacrylate, Vinyltriethoxysilane, Vinyltrimethoxysilane, Vinyl-tris-(2-methoxyethoxy)silane, and Vinylmethyldimethoxysilane;

wherein the platinum salt includes at least one of platinum amine, platinum chloride, and platinum ammonium;

wherein the tube is monolithically formed, wherein the tube is in direct physical contact with the light source and the light guide plate, wherein the plurality of wavelength conversion particles include quantum dots, wherein the matrix has a refractive index in a range of from 1.4 to 1.6, wherein the matrix is in contact with an inner surface of the tube, wherein at least one surface of the matrix is in contact with an air layer, wherein the tube extends continuously along the incident surface of the light guide plate, and wherein the light source includes a plurality of blue LEDs and the plurality of blue LEDs are disposed along the incident surface of the light guide plate.

4. The backlight assembly of claim 3, wherein the tube includes a first end and a second end opposite from the first end, wherein the first end of the tube is closed, and
wherein a length of the matrix, taken in a first direction, from the contact surface that is disposed between the air layer and the matrix to an imaginary plane that is perpendicular to a central longitudinal axis and includes a midpoint between the second end and the first end along the first direction, is less than a length of the matrix, taken in the first direction, from the imaginary plane to an end of the matrix closest to the first end.

5. The backlight assembly of claim 3, wherein the tube includes a first end and a second end opposite from the first end, wherein the first end of the tube is closed, and
wherein a mass of the matrix, taken in a first direction, from the contact surface that is disposed between the air layer and the matrix to an imaginary plane that is perpendicular to a central longitudinal axis and includes a midpoint between the second end and the first end along the first direction, is less than an amount of the matrix, taken in the first direction, from the imaginary plane to an end of the matrix closest to the first end.

6. The display device of claim 1, wherein the tube includes a first end and a second end opposite from the first end,
wherein the one end of the tube is closed, and
wherein the other end of the tube is an entrance for feeding the matrix.

7. The display device of claim 6, further comprising a sealing part disposed in the tube and the sealing part is disposed at the second end of the tube to seal the tube,
wherein the air layer is disposed between the matrix and the sealing part.

8. The display device of claim 6, wherein a length of the matrix, taken in a first direction, from a contact surface that is disposed between the air layer and the matrix to an imaginary plane that is perpendicular to a central longitudinal axis and includes a midpoint between the second end and the first end along the first direction, is less than a length of the matrix, taken in the first direction, from the imaginary plane to an end of the matrix closest to the first end.

9. The display device of claim 1, wherein an amount of the matrix, taken in a first direction, from a contact surface that is disposed between the air layer and the matrix to an imaginary plane that is perpendicular to a central longitudinal axis and includes a midpoint between the second end and the first end along the first direction, is less than an amount of the matrix, taken in the first direction, from the imaginary plane to an end of the matrix closest to the first end.

10. The display device of claim 1, further comprising a contact surface that is disposed between the air layer and the matrix,
wherein the contact surface includes a curved shape.

11. The display device of claim 1, wherein the air layer includes additional nitrogen.

* * * * *